United States Patent
Reisch et al.

(10) Patent No.: US 12,292,103 B2
(45) Date of Patent: May 6, 2025

(54) TRANSMISSION FOR AN INTEGRAL DIFFERENTIAL, INTEGRAL DIFFERENTIAL AND DRIVE TRAIN

(71) Applicant: ZF Friedrichshafen AG, Friedrichshafen (DE)

(72) Inventors: Matthias Reisch, Ravensburg (DE); Florian Petrich, Kressbronn (DE); Danilo Lind, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/578,899

(22) PCT Filed: Jun. 22, 2022

(86) PCT No.: PCT/EP2022/066942
§ 371 (c)(1),
(2) Date: Jan. 12, 2024

(87) PCT Pub. No.: WO2023/285089
PCT Pub. Date: Jan. 19, 2023

(65) Prior Publication Data
US 2024/0376971 A1    Nov. 14, 2024

(30) Foreign Application Priority Data
Jul. 15, 2021   (DE) ..................... 10 2021 207 527.4

(51) Int. Cl.
*F16H 57/04*    (2010.01)
*F16H 48/10*    (2012.01)
(Continued)

(52) U.S. Cl.
CPC ........... *F16H 48/10* (2013.01); *F16H 57/029* (2013.01); *F16H 57/037* (2013.01);
(Continued)

(58) Field of Classification Search
CPC ...... F16H 48/10; F16H 57/037; F16H 57/045; F16H 57/0471; F16H 57/0483;
(Continued)

(56) References Cited

U.S. PATENT DOCUMENTS

| 7,001,298 B2 * | 2/2006 | Biermann ............... F16D 25/14 |
| | | 475/116 |
| 10,300,905 B2 * | 5/2019 | Holmes ................... F16H 48/10 |

(Continued)

FOREIGN PATENT DOCUMENTS

| CN | 101539187 B | 10/2010 |
| CN | 102011837 B | 11/2013 |

(Continued)

OTHER PUBLICATIONS

PCT Search Report, Sep. 30, 2022.
German Search Report, Mar. 3, 2022.

*Primary Examiner* — Sherry L Estremsky
(74) *Attorney, Agent, or Firm* — Dority & Manning, P.A.

(57) ABSTRACT

A transmission for an integral differential, the transmission having a fixed housing part, and a first planetary gear set defining an axis of rotation. The first planetary gear set has a planet carrier fixed to the fixed housing part to seal a lubricant chamber spatially delimited by the planet carrier and the fixed housing part, where at least a portion of the lubricant chamber extends around the axis of rotation. The first planetary gear set further includes planetary bearings, the planetary bearings being supplied with lubricant from the lubricant chamber. Moreover, the first planetary gear set includes planet gears, each of the planet gears being rotatably mounted on the planet carrier via at least one respective bearing of the planetary bearings. Additionally, the first planetary gear set includes a sun gear and a ring gear, each meshing with the planet gears.

21 Claims, 2 Drawing Sheets

(51) Int. Cl.
*F16H 57/029* (2012.01)
*F16H 57/037* (2012.01)
*F16H 57/08* (2006.01)
*F16H 57/02* (2012.01)

(52) U.S. Cl.
CPC ....... *F16H 57/0415* (2013.01); *F16H 57/043* (2013.01); *F16H 57/045* (2013.01); *F16H 57/0471* (2013.01); *F16H 57/0483* (2013.01); *F16H 57/082* (2013.01); *F16H 2048/104* (2013.01); *F16H 2048/106* (2013.01); *F16H 2057/02034* (2013.01); *F16H 2057/02052* (2013.01); *F16H 2057/085* (2013.01)

(58) Field of Classification Search
CPC ......... F16H 57/082; F16H 2057/02034; F16H 2057/02052; F16H 2048/104; F16H 2048/106; B60K 2001/001
See application file for complete search history.

(56) References Cited

U.S. PATENT DOCUMENTS

| | | | |
|---|---|---|---|
| 10,473,169 B2 * | 11/2019 | Yoshisaka | F16D 27/108 |
| 10,630,140 B2 * | 4/2020 | Pritchard | B60K 17/046 |
| 10,655,725 B2 * | 5/2020 | Kodama | F16H 57/043 |
| 11,413,946 B2 * | 8/2022 | Absenger | F16H 57/045 |
| 11,815,169 B2 * | 11/2023 | Reisch | F16H 48/26 |
| 2018/0135740 A1 | 5/2018 | Kodama et al. | |
| 2018/0172138 A1 | 6/2018 | Nakano et al. | |
| 2024/0159298 A1 * | 5/2024 | Doepfert | F16H 57/0479 |

FOREIGN PATENT DOCUMENTS

| | | | |
|---|---|---|---|
| DE | 10 2011 108 170 A1 | 1/2013 | |
| DE | 102019103613 A1 * | 8/2020 | ............... B60K 1/00 |
| DE | 10 2019 216 507 A1 | 4/2021 | |
| JP | 2004-116736 A | 4/2004 | |
| JP | 2011-252530 A | 12/2011 | |
| WO | WO 2020/052768 A1 | 3/2020 | |

* cited by examiner

TRANSMISSION FOR AN INTEGRAL DIFFERENTIAL, INTEGRAL DIFFERENTIAL AND DRIVE TRAIN

CROSS-REFERENCE TO RELATED APPLICATION

The present application is related and has right of priority to German Patent Application No. 10 2021 207 527.4 filed on Jul. 15, 2021 and is a nationalization of PCT/EP2022/066942 filed in the European Patent Office on Jun. 22, 2022, both of which are incorporated by reference in their entirety for all purposes.

FIELD OF THE INVENTION

The present subject matter relates generally to a transmission which includes at least one first planetary gear set having a planet carrier, which is fixed to the housing. The present subject matter further relates generally to an integral differential, and to a drive train.

BACKGROUND

DE 10 2011 108 170 A1 describes a motor vehicle which includes an internal combustion engine, an electric machine, and a housing, the housing surrounding at least one planetary transmission. The planetary transmission couples the internal combustion engine and the electric machine to one another and includes at least one sun gear, one planet carrier, one planet gear, and one ring gear. The planetary transmission has a separate recirculating lubrication system which includes a lubricant reservoir, a system of bore holes in a portion of the housing for transporting a lubricant to at least one component of the planetary transmission, a feed of the lubricant to a contact point between two parts of the planetary transmission that are movable relative to one another, and a rotating drive element for the lubricant, which accelerates the lubricant. The rotating drive element is an integral part of the planetary transmission. In one embodiment, the ring gear and the sun gear of the planetary transmission are rotatable, and the planet carrier of the planetary transmission is fixed to the housing. The planet carrier has a first lubricant guide, which is inclined relative to the horizontal plane, for guiding the lubricant from the planet carrier to the sun gear, and a second lubricant guide for guiding the lubricant from the planet carrier to a bearing of a planet gear. The bearing of the planet gear is, for example, a needle bearing or a plain bearing. The rotatable sun gear is, for example, a first drive element of the planetary transmission for driving the lubricant. The rotatable sun gear has lubricant guides for guiding the lubricant in a direction away from the center of rotation of the drive element. The rotatable sun gear is, for example, a second drive element, and forms a gap between a portion of its surface and a surface of a fixed part of the planetary transmission.

SUMMARY OF THE INVENTION

The present subject matter is directed to a compact planetary transmission having a planet carrier, which is fixed to the housing.

A transmission according to example aspects of the invention for an integral differential includes at least one first planetary gear set. Each of the at least one first planetary gear set has a planet carrier, one sun gear, and one ring gear. The planet carrier is fixed to the housing, and multiple planet gears are arranged on the planet carrier, with each planet gear being rotatably mounted on the planet carrier via respective planetary bearings. The sun gear and the ring gear each mesh with the planet gears. At least a portion of a lubricant chamber for supplying the planetary bearings with lubricant is arranged around an axis of rotation of the at least first planetary gear set, the lubricant chamber being spatially delimited by the planet carrier and a fixed housing part, the planet carrier being arranged on the fixed housing part so as to seal the lubricant chamber. In other words, due to the planet carrier, which is fixed in position or is fixed to the housing, the transmission is a stationary transmission which is usable in different areas of application. In particular, the transmission is usable in an integral differential. The term "fixed to the housing" should be understood in the present case to mean that relative motion does not takes place or cannot take place between the planet carrier fixed to the housing and the housing of the transmission as well as the fixed housing part. The planet carrier, as well as the fixed housing part, is axially fixed, radially fixed, and non-rotatable in relation to the rest of the transmission housing.

The at least one first planetary gear set is preferably part of a planetary transmission of an integral differential having, as the gear set elements, a first sun gear, a first ring gear, and having multiple planet gears, which are guided by a first planet carrier on a circular path around the first sun gear. Advantageously, the first planetary gear set has precisely one stationary gear ratio. In one possible embodiment of the transmission, the first planetary gear set is the reverse gearing of an integral differential.

The lubricant chamber is provided for guiding a lubricant and is in the form of an at least partially annular duct extending at least partially around the rotation axis of the at least first planetary gear set. Within the scope of this invention, a lubricant should be understood as lubricating the intermeshed teeth of the gear set elements. A lubricant should also be understood to be a coolant which is conducted in the lubricant chamber. Oil, for example, is suitable for use as lubricant. The lubricant chamber has at least one inlet and at least one outlet. In addition, the lubricant chamber is connected to connecting sections which conduct the lubricant to the planetary bearings of the planet gears in order to lubricate and, if necessary, cool the planet gears as well as the ring gear and the sun gear intermeshed with the planet gears. The lubricant chamber is defined or "formed" and spatially delimited by the planet carrier and the fixed housing part.

A spatial delimitation should be understood to mean that the lubricant cannot inadvertently emerge from the lubricant chamber radially and axially between the planet carrier and the fixed housing part. The planet carrier is therefore technically sealed with respect to the fixed housing part. "Sealed" should be understood to mean that the lubricant conducted in the lubricant chamber cannot inadvertently emerge from the lubricant chamber. Leaks are therefore prevented. It is also conceivable, however, that a small amount of leakage or a minor leak of lubricant out of the lubricant chamber is intentionally accepted, wherein the amount of emerging lubricant is so low, however, that a sufficient amount of lubricant is still conducted through the lubricant chamber, wherein, simultaneously, even further components, in addition to the planet gears, are lubricated and/or cooled with the lubricant conducted in the lubricant chamber. A lubricant duct for supplying lubricant for the planetary bearings is therefore formed on the planet carrier, which is fixed to the housing, the lubricant duct being substantially formed by the planet carrier and the fixed housing part.

The lubricant chamber is fluidically connected to a pump, which delivers the lubricant into the lubricant chamber via the particular inlet. The pump is preferably secured on the housing of the transmission and delivers the lubricant into the lubricant chamber directly or via further ducts, i.e., at least indirectly. The pump pumps the lubricant out of a lubricant sump, which is fluidically connected to the outlet of the lubricant chamber. From the lubricant chamber, the lubricant therefore at least indirectly flows back into the lubricant sump via the outlet.

The lubricant is preferably fed to the lubricant chamber radially from the outside. In other words, the inlet is arranged radially outwards on the transmission and is fluidically connected to the lubricant chamber. This simplifies the connection of the pump to the transmission, in particular to the lubricant chamber.

Alternatively, the lubricant chamber is formed in the shape of a polygon around the axis of rotation of the at least first planetary gear set. The duct formed by the lubricant chamber, regardless of its shape, extends all the way around, i.e., to be closed, or to extend 360° around the axis of rotation of the at least first planetary gear set. Advantageously, the lubricant chamber reaches planet shafts distributed on the circumference for lubrication and cooling. Alternatively, the lubricant chamber extends by less than 360° around the axis of rotation of the at least first planetary gear set. Consequently, the lubricant chamber is not closed. In this case, the lubricant chamber must have at least two outlets.

The point at which the lubricant is removed or drains from the lubricant chamber, i.e., the particular outlet, is preferably arranged diametrically opposite the particular inlet. This applies for a lubricant chamber which is circumferential and closed. It is conceivable that the lubricant flows are divided, i.e., conducted by at most 180° around the axis of rotation of the at least first planetary gear set. In this way, the lubricant flows always take the same path back to the particular outlet. From the outlet, the lubricant is also fed to further lubrication and/or cooling points before it reaches the lubricant sump.

The lubricant chamber extends around the rotation axis of the at least first planetary gear set, in particular such that the lubricant is conducted to each of the planet gears. By suitably arranging the angular position of the planet gears in the first planetary gear set, a fully circumferential lubricant chamber or lubricant duct is omittable, ultimately reducing the amount of lubricant that is necessary, the lubricant being conducted mainly to the planet gears.

The wording "the planet carrier is arranged on the fixed housing part so as to seal the lubricant chamber" should be understood to mean that the planet carrier comes to rest against the fixed housing part, i.e., is supported directly thereon. The wording should be further understood to mean that the planet carrier is arranged with respect to the fixed housing part such that these do not come to rest directly against one another, but rather that a sealing effect is generated therebetween, for example, by a sealing element arranged therebetween. In addition, although the fixed housing part is attachable directly to the planet carrier, there is no further connection to the rest of the transmission housing. The planet carrier is therefore not supported against the fixed housing part. This is the case, for example, when the fixed housing part is a cover of the planet carrier.

In one embodiment, preferably at least one sealing element is arranged between the planet carrier and the fixed housing part so as to seal the lubricant chamber. The sealing element is advantageous, in particular, when a sealing effect brought about by the planet carrier coming to rest axially against the fixed housing part, or vice versa, is not sufficient. Recesses, in particular grooves, which accommodate the sealing element, are provided or defined in the planet carrier and/or in the housing part for this purpose. O-rings, for example, are suitable for use as a sealing element. Due to a suitable arrangement of the sealing element, the lubricant chamber is enlargeable in a specific manner in order to supply further elements of the transmission with lubricant.

According to one exemplary embodiment, the fixed housing part is a transmission housing of the transmission. In other words, the fixed housing part is the main housing in which at least a portion of the transmission is accommodated. The main housing is a housing of the drive train and, therefore, spatially delimits or accommodates further devices of the drive train. The fixed housing part is integrally connected to the rest of the transmission housing. The transmission housing is closed at one end or at both ends by a cover or is connectable to further components of an integral differential which includes the transmission, and/or of the drive train which includes a differential of this type. The planet carrier preferably axially comes to rest against the transmission housing.

Alternatively, the fixed housing part is a cover element of the transmission. For this purpose, the cover element at least partially axially closes the aforementioned main housing. A housing interface is therefore formed between the cover element and the main housing. In this case, the planet carrier is indirectly supported on the transmission housing or on the main housing. Alternatively, the cover element is also directly axially arrangeable on the planet carrier and attached thereto, such that the planet carrier is not directly connected to the transmission housing. Therefore, the fixed housing part and the rest of the transmission housing or the main housing have a two-part or multi-part design (are in two or more separate parts), wherein the fixed housing part does not rest against the transmission housing. The cover element is therefore either directly attached to or supported against the transmission housing or is directly attached to or supported against the planet carrier.

The planetary bearing is, for example, a needle bearing, wherein lubricant is supplied to the particular planet gear via a planet shaft, which is non-rotatably arranged on the planet carrier and accommodates the planetary bearing for mounting the particular planet gear. Multiple planet shafts are arranged on the planet carrier, each of which accommodates a planetary bearing for rotatably mounting the associated planet gear.

Preferably, the planet shaft has axially and radially extending ducts in order to fluidically connect the lubricant chamber at least indirectly to the planetary bearing. The ducts are arranged in the planet shaft such that they are simply produced. For example, the ducts are bores in the planet shaft, which intersect or meet one another in order to be fluidically connected to one another. The ducts at least indirectly fluidically connect the lubricant chamber to the planetary bearings.

According to one exemplary embodiment, an orifice bore is arranged on or part of the axially and/or radially extending duct. The orifice bore, which is also referred to simply as an orifice, is a local taper, which has a smaller through-flow cross-section than the cross-section of the ducts on the planet shaft. It is also conceivable that at least one of the ducts on the planet shaft is an orifice bore. A lubricant pressure is set by the orifice, such that the desired amount of lubricant always reaches the particular planetary bearing arranged thereon via the planet shafts. The orifice bore is formed or arranged on an axially extending duct or duct section. Alternatively, or additionally, the orifice bore is formed or arranged on a radially extending duct or duct section. It is also conceivable that an axial duct and/or a radial duct is the orifice bore.

Preferably, the particular planet shaft is secured in the lubricant chamber. In some embodiments, for example, a pin which extends radially on the planet shaft is provided within the lubricant chamber. Therefore, in some instances, the pin for securing the planet shaft is a radial pin, which prevents the planet shaft from shifting axially in a first axial direction. In an opposite, second axial direction, the planet shaft is supported against the planet carrier. In addition, in some embodiments, the planet shaft is secured against a turning motion relative to the planet carrier. Alternatively, or additionally, in some embodiments, the planet shaft is secured by a securing ring and/or a snap ring. Preferably, recesses or indentations are formed or defined in the planet carrier, which are provided for accommodating the pin, the securing ring, and/or the snap ring for securing the planet shaft. In addition, the recesses allow the, the securing ring, and/or the snap ring for securing the planet shaft, in particular a pin, to be easily installed.

Preferably, at least a portion of the planet carrier and/or the fixed housing part is produced via casting. As a result, the transmission is particularly economically produced. In addition, the components are slimmer and lighter. In particular, it is possible to introduce pin-fin structures, honeycomb structures, rib structures or the like.

In order to be able to easily install the planet carrier of the at least first planetary gear set and simultaneously ensure a secure, rotationally fixed connection with respect to the housing of the transmission, the planet carrier is preferably secured against rotation with respect to the fixed housing part via a driving tooth system. The driving tooth system is provided, in particular, for securing the planet carrier against rotation about its own main axis or longitudinal axis. Therefore, torque of the transmission is supported against the housing via the planet carrier and the driving tooth system.

The driving tooth system is preferably produced via casting. As a result, mechanical, in particular machining-based, re-working is not necessary, as a result of which the manufacturing costs of the relevant component are reduced.

The driving tooth system has a tooth system on the planet carrier and a tooth system on the fixed housing part, with the tooth systems being intermeshed. The driving tooth system is preferably defined on a side piece of the planet carrier in a radially outer area of the side piece or a radially inner area of the side piece. In the radially outer area, the tooth system on the planet carrier is formed as external toothing, which is meshed with internal toothing on the fixed housing part. In the radially inner area, the tooth system on the planet carrier is formed as internal toothing, which is meshed with external toothing on the fixed housing part. The driving tooth system allows the planet carrier to be installed on the fixed housing part in an axial direction, wherein the planet carrier is axially secured with respect to the fixed housing part via, for example, a housing element, in particular a cover of the transmission housing.

Preferably, the driving tooth system is arranged within the lubricant chamber. A lubricant film forms between the teeth of the particular tooth system that come into contact with one another, and has an, in particular positive, effect on the acoustic properties of the transmission. It is also conceivable, of course, to provide the driving tooth system outside the lubricant chamber, for example, when this is specified by the available installation space.

Further preferably, the driving tooth system is arranged on an axial end face of the planet carrier. If the driving tooth system is attached to the planet carrier radially outwards, this is advantageous for being able to remove the planet compartment from the mold, for example, in the radial direction, when the planet carrier is produced using die casting technology. If the driving tooth system is attached to the planet carrier radially inwards, the driving tooth system must be provided on the axial end face of the planet carrier.

Example aspects of the invention include the technical teaching that the driving tooth system secures the planet carrier against incorrect installation. In other words, the planet carrier and/or the fixed housing part permits the planet carrier to be installed in only one possible position, in particular in a certain angular position. Therefore, the planet carrier is installed in the desired angular position, such that the planet gears, which do not travel around the axis of rotation of the transmission on a circular path, are always arranged in the desired position with respect to the transmission housing. The planet carrier is arranged, in particular, such that there is a maximum height difference in the vertical direction or in the direction of gravity between the uppermost planet gear, with respect to the direction of gravity, and the lowermost planet gear, with respect to the direction of gravity, that is as small as possible. The lubricant chamber is adapted thereto. In particular, the lubricant chamber does not need to be formed around the entire planet carrier.

Using the adapted driving tooth system as an example, the driving tooth system has one or more geometrically modified tooth/teeth, structure(s) and/or shaped element(s), which are mounted exclusively in a complementary structure and/or on a correspondingly modified tooth and/or a corresponding shaped element.

Alternatively, or additionally, the driving tooth system is arranged on a part of the transmission housing on which an interface is formed for mounting the transmission on the chassis. This part of the transmission housing is the transmission housing itself or, alternatively, the housing of an electric machine, which also accommodates the driving tooth system. In other words, the housing of the electric machine surrounds at least part of the driving tooth system for preventing rotation of the planet carrier. As a result, the transmission support torque is introduced directly into the chassis of the motor vehicle without the need to first direct this across an additional housing interface. As a result, the housing interfaces are slimmer. In particular, the fasteners must transmit lower loads. Such a housing interface is preferably located axially at the planet carrier drive (the electric machine).

Alternatively, incorrect installation is also prevented in other ways. In one instance, male and female elements, parts, or sections for preventing incorrect installation are formed or arranged on the planet carrier and on the fixed housing part. In some instances, for example, a radially extending pin is inserted into a complementary recess. In particular, the pin, whether it is arranged on the planet carrier, on the fixed housing part or on the rest of the transmission housing, prevents the planet carrier from being installed in an angular position relative to the transmission housing other than the specified angular position. Therefore, the planet carrier and/or the fixed housing part have irregular geometry components in the region of the driving tooth system or other structures, which prevent the planet carrier from being installed in an undesired angular position. Conceivable possibilities are a wider tooth of the driving tooth system, a narrower tooth of the driving tooth system, a missing tooth of the driving tooth system, an additional tooth of the driving tooth system, a deviating flank angle of the driving tooth system.

The fixed housing part preferably axially secures and/or for centers the planet carrier. The planet carrier is centered either on or in the fixed housing part. When the planet carrier is centered on the fixed housing part, the fixed housing part has an external geometry or an internal geometry which accommodates the planet carrier for centering. Alternatively, or additionally, the first housing part or the second housing part—in this case a first housing part or a second housing part arranged on the main housing and at least axially coming to rest thereon—has an end-face contact surface, against which the planet carrier is axially supported and, as a result, axially secured.

The fixed housing part preferably conducts a cooling medium, on a side of the fixed housing part facing away from the lubricant chamber. Therefore, the fixed housing part, in addition to the lubricant, is used simultaneously for heat transfer and for use as a heat exchanger. Heat is generated during operation of the transmission, the heat being absorbed and dissipated from the planetary gear set, in particular from the planet carrier, by a lubricant conducted in the lubricant chamber and by the fixed housing part. The dissipation of the heat via the fixed housing part is facilitated by the cooling medium, which, in one example, comes into direct contact with the fixed housing part. In other words, the fixed housing part is acted upon by the cooling medium. The way the fixed housing part conducts the cooling medium, in particular, enlarges a contact surface with the cooling medium. The cooling medium is a fluid, in particular air, oil or water.

In one exemplary embodiment, the fixed housing part has a surface structure on the side facing away from the lubricant chamber, the surface structure enlarges or maximizes a surface which is in contact with the cooling medium. The larger the contact surface, the greater the amount of heat that is given off or transferred by the fixed housing part to the cooling medium. In addition, the surface structure promotes and/or generates eddies in the cooling medium. Eddies cause turbulent flows to be generated in the cooling medium, which in turn improves the heat transfer. The surface structure of the fixed housing part is preferably a honeycomb structure, a rib structure, a pin-fin structure, and/or the like.

Alternatively, or additionally, the fixed housing part has a surface structure on the side facing the lubricant chamber, the surface structure enlarges or maximizes a surface which is in contact with the cooling medium. The larger the contact surface, the greater the amount of heat that is given off or transferred by the lubricant to the fixed housing part. Eddies for generating turbulent flows are likewise facilitated by the surface structure. In this case as well, it is conceivable that the surface structure is a honeycomb structure, a rib structure, a pin-fin structure and/or the like. Therefore, the fixed housing part has appropriate surface structures on only one side or on both sides, the surface structures improving the heat transfer, in particular for dissipating heat from the at least first planetary gear set.

An integral differential according to example aspects of the invention for a drive train of a motor vehicle includes a transmission as described above, the transmission having a first planetary gear set and a second planetary gear set operatively connected thereto. In an integral differential, the sum of both wheel torques are not combined in one component to form a single axle torque. Rather, drive power in the integral differential is divided and, in accordance with the first and the second planetary gear sets, transferred into the output shafts which are operatively connected to the planetary gear sets. Therefore, the components of the integral differential are slimmer due to the respective, relatively low torque. In addition, the number of components is reduced, and weight is reduced. By a differential of this type, the two functions, namely torque conversion and torque distribution, which previously were carried out by two separate assemblies, are carried out using one single integral assembly. Example aspects of the invention are therefore a combined transmission and differential which converts as well as distributes torque onto the output shafts.

The term "operatively connected" should be understood to mean a permanent connection between two components, the permanent connection being provided for permanently transmitting drive power, in particular rotational speed and/or torque. The connection is implemented directly or via a fixed ratio. The connection is implemented, for example, via a fixed shaft, a toothing, in particular a spur gear tooth system, and/or a wrap-around element.

The term "at least indirectly" should be understood to mean that two components are (operatively) connected to one another via at least one other component, located between the two components, or that the two components are directly connected to one another. Other components are also arrangeable between shafts or gear wheels, which are operatively connected to the shaft or to the gear wheel. In addition, duct sections of the lubricant duct are fluidically connected to one another directly or indirectly via further ducts.

An integral differential should be understood within the scope of this invention to be a differential which includes a first planetary gear set and a second planetary gear set, wherein the second planetary gear set is drivingly connected, for example, to an input shaft, to the first planetary gear set, and to a second output shaft. The first planetary gear set is drivingly connected to a first output shaft. The input torque at the input shaft is convertible by such an integral differential and is distributable and transmittable at a defined ratio onto the two output shafts. Preferably, 50%, i.e., one half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical.

Consequently, the intermeshed components in the differential always rotate in relation to one another, independently of the output rotational speeds of the output shafts. The output shafts of the differential are, in particular, at least indirectly connected to a wheel on the motor vehicle.

A "shaft" should be understood to be a rotatable component of the transmission, via which associated components of the transmission are connected to each other for conjoint rotation or via which a connection of this type is established upon actuation of an appropriate shift element. The shaft connects the components to one another axially or radially or also both axially and radially. A shaft should not be understood exclusively to be a, for example, cylindrical, rotatably mounted machine element for transmitting torques, but rather a shaft should also be understood to refer to general connecting elements that connect individual components or elements to one another, in particular, connecting elements that connect multiple elements to one another for conjoint rotation.

The second planetary gear set, similarly to the first planetary gear set, is part of the planetary transmission which is integrated in the differential and includes, as gear set elements, a second sun gear, a second ring gear, and multiple planet gears, the planet gears being guided by a second planet carrier on a circular path around the second sun gear. Advantageously, the second planetary gear set has precisely one stationary gear ratio.

A drive train for a motor vehicle according to example aspects of the invention has a drive unit which generates drive power and distributes the drive power onto two output shafts at least indirectly via an integral differential of the aforementioned type. The drive unit is preferably an electric machine, wherein a rotor shaft of the electric machine is connected or coupled for conjoint rotation to an input of the integral differential, in particular to the ring gear or to the sun gear of the first planetary gear set or to one of the gear set elements of a second planetary gear set of the differential. The rotor is mounted for rotation with respect to a stator of the electric machine, said stator being fixed in place on a stator carrier. The electric machine is preferably connected to an accumulator, which supplies the electric machine with electrical energy. Moreover, the electric machine is preferably controllable by way of an open-loop or closed-loop system by a power electronics system. Alternatively, or additionally, the drive unit is an internal combustion engine, wherein, in this case, the input shaft is, for example, a crankshaft, or is connected to a crankshaft for conjoint rotation.

Preferably, the stator carrier is the fixed housing part of the transmission. In other words, the transmission and, in particular, the planet carrier, are arranged on the electric machine, wherein the planet carrier is supported against the stator carrier. In this case, the planet carrier and the stator carrier form and spatially delimit the lubricant chamber.

The power train is provided in a motor vehicle, in particular, an automobile (for example, a passenger car weighing less than 3.5 tons), a bus, or a truck (busses and trucks can weigh more than 3.5 tons). In particular, the motor vehicle is an electric vehicle or hybrid vehicle. The motor vehicle has at least two axles, in which one of the axles is formed by a drive axle that is drivable by the power train. The power train according to example aspects of the invention is operatively arranged on this drive axle and the power train transmits drive power to at least one of the wheels, preferably onto both wheels, on this axle. It is also conceivable that there is a separate power train of this type for each axle, such that each axle has an axle drive as described above.

The above definitions and explanations of technological effects, advantages and advantageous embodiments of the transmission according to example aspects of the invention also apply analogously to the integral differential according to the example aspects of invention and to the drive train according to example aspects of the invention.

BRIEF DESCRIPTION OF THE DRAWINGS

One preferred exemplary embodiment of the invention is explained in greater detail in the following with reference to the drawings, wherein identical or similar elements are labeled with the same reference characters, wherein.

DETAILED DESCRIPTION

Figure 1:
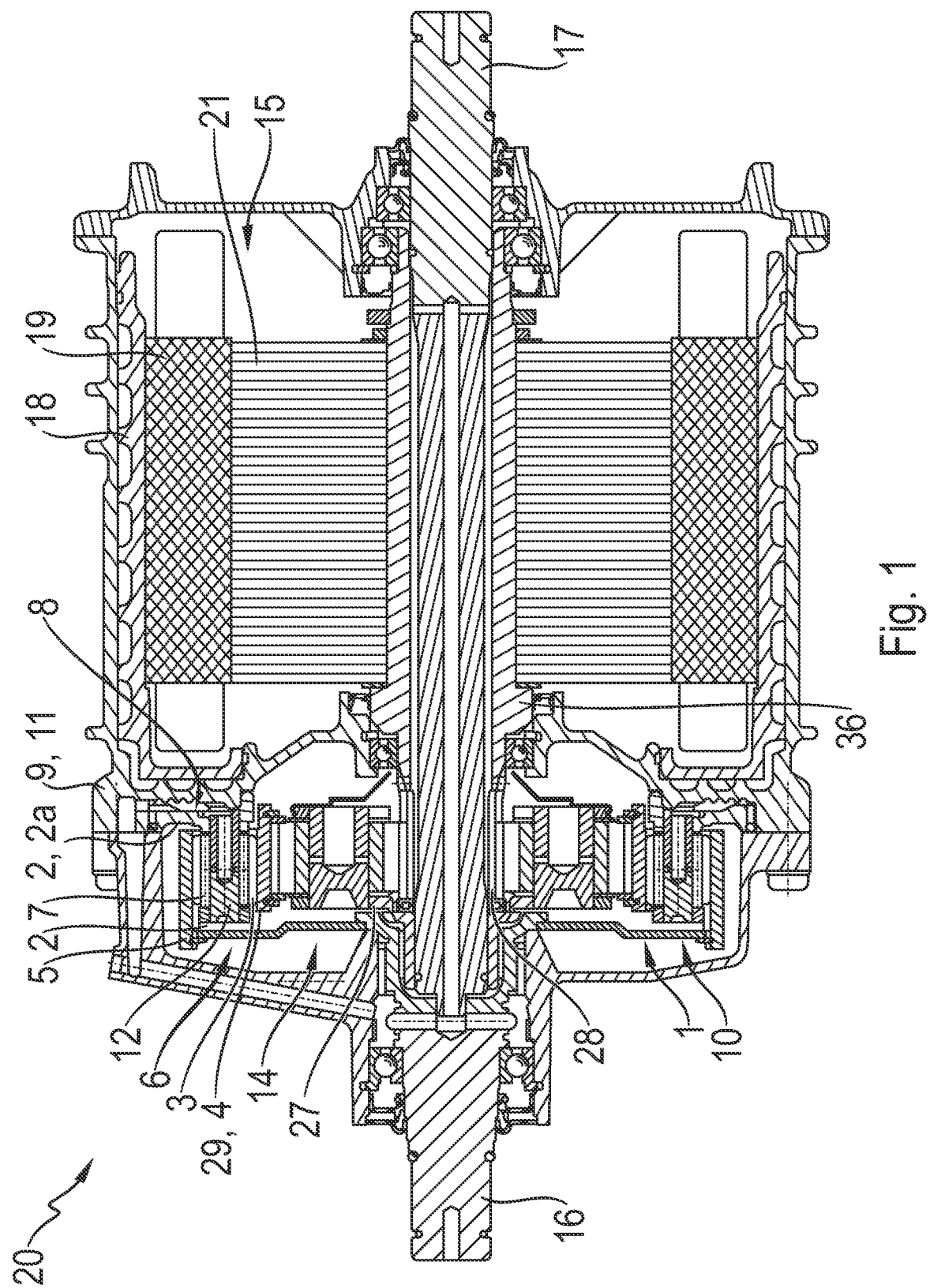
FIG. 1 shows a simplified schematic longitudinal sectional view of a drive train according to example aspects of the invention, the drive train having a transmission according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a drive train 20 according to example aspects of the invention for a motor vehicle (not shown here). The drive train 20 is an electric axle drive including a drive unit 15, which is an electric machine. The drive unit 15 generates drive power and distributes the drive power onto two output shafts 16, 17 via an integral differential 10. The drive unit 15 has a stator 19, which is fixed in place on a stator carrier 18, and a rotor 21, which is rotatable relative to the stator 19.

The integral differential 10 of the drive train 20 has a transmission 1 that includes a first planetary gear set 6 and a second planetary gear set 14, which is operatively connected to the first planetary gear set 6. The two planetary gear sets 6, 14 are radially nested. Radial nesting saves axial installation space of the drive train 20. The differential 10 combines the function of transmission gearing and the differential function without first forming an axle torque, i.e., the cumulative torque of two wheel torques.

Both planetary gear sets 6, 14 are negative planetary gear sets in the present case and each includes a sun gear, a ring gear and a planet carrier as the gear set elements. In the present case, the first planetary gear set 6 is arranged radially outside the second planetary gear set 14, wherein the gear set elements of the first planetary gear set 6 include a sun gear 4, a ring gear 5, and a planet carrier 2. The first planetary gear set 6 has multiple planet gears 3, which are rotatably mounted on planet shafts 12 via planetary bearings 7. The planet shafts 12 in turn are non-rotatably mounted on the planet carrier 2. The planet carrier 2 of the first planetary gear set 6 is fixed to the housing. The ring gear 5 of the first planetary gear set 6 is connected to the first output shaft 16 for conjoint rotation. The gear set elements of the second planetary gear set 14 include a planet carrier 27, a sun gear 28, and a ring gear 29. The sun gear 4 of the first planetary gear set 6 is formed in one piece with the ring gear 29 of the second planetary gear set 14. The planet carrier 27 of the second planetary gear set 14 is connected to the second output shaft 17 for conjoint rotation. The drive unit 15 drives the sun gear 28 of the second planetary gear set 14. The sun gear 28 is connected to the rotor shaft 36 of the drive unit 15, which is an electric machine, for conjoint rotation. Alternatively, in some embodiments, the planetary gear sets 6, 14 are instead arranged axially adjacent to one another.

Figure 2:
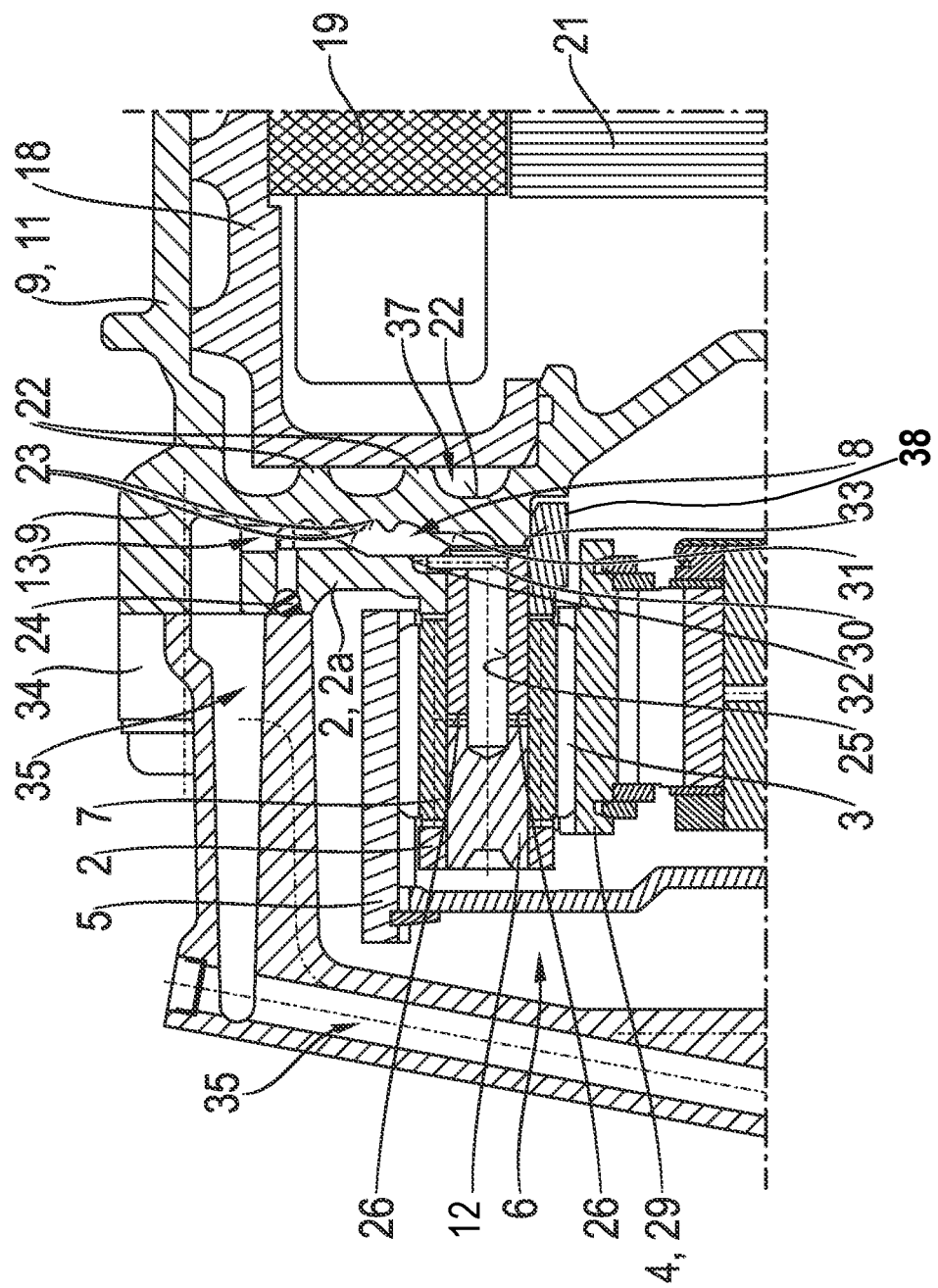
FIG. 2 shows a simplified schematic partial sectional view of the transmission according to example aspects of the invention.

As is shown in FIG. 2 in greater detail, an annular lubricant chamber 8 for supplying the planetary bearings 7 with lubricant is arranged around an axis of rotation or the longitudinal axis of the first planetary gear set 6. The lubricant chamber 8 is formed or defined spatially between the planet carrier 2 and a fixed housing part 9. In other words, the lubricant chamber 8 is spatially delimited by the planet carrier 2 of the first planetary gear set 6 and by a fixed housing part 9. The planet carrier 2 of the first planetary gear set 6 comes to rest against the fixed housing part 9 so as to seal the lubricant chamber 8.

In the present case, the planet carrier 2 of the first planetary gear set 6 and the transmission housing 11 of the transmission 1 jointly form the circumferential lubricant chamber 8. Neither the lubricant nor the inlet to and outlet from the lubricant chamber 8 are shown here. Both the planet carrier 2 and the fixed housing part 9, i.e., the transmission housing 11 in the present case, are produced via casting, for example, by die casting. Recesses 31 are formed on or defined in the transmission housing 11, through which lubricant is conducted out of the lubricant chamber 8, which should be understood as an at least partially annular duct, to the planet shafts 12.

The axial support of the planet carrier 2 of the first planetary gear set 6 on the transmission housing 11 or on the fixed housing part 9 is used simultaneously to axially secure the planet shafts 12 in a first axial direction. The planet shaft 12 is prevented from shifting in the opposite direction by a pin 30 for axially securing the planet shaft 12. Starting from the longitudinal axis of the planet shaft 12, the pin 30 is inserted, extending substantially radially, into the planet shaft 12, in particular being pressed in, and projects beyond the outer diameter of the planet shaft 12, wherein the radially projecting section of the pin 3 prevents the planet shaft 12 from shifting to the left as shown in the present representation. Recesses 32 are also provided on the planet carrier 2 for the pins 30, the recesses in turn preventing the pins 30 from being able to radially move out of the planet shaft 12 after installation. Furthermore, the recesses 32, in combination with the pins 30, prevent the planet shafts 12 from turning in the planet carrier 2 in an undesirable manner.

Each planet shaft 12 has an axial duct 25 and two radially extending ducts 26 which are fluidically connected to the axial duct 25. The axial duct 25 is fluidically connected to the particular recess 31 defined in the transmission housing 11 and the radial ducts 26 are fluidically connected to the outer circumference of the planet shaft 12 and to the planet carrier 2. The radial ducts 26 directly adjoin or connect to the axial duct 25. The radially extending ducts 26 each have a smaller cross-section than the axially extending duct 25 and, as a result, each act as an orifice bore, by which a lubrication pressure is set at the planet carrier 2. Therefore, the planet shaft 12 defines an orifice bore as part of the radially extending duct 26.

The transmission housing 11 has a portion with an inner circumferential surface 33 into which the planet carrier 2 is axially inserted during assembly, such that the planet carrier 2 is centered with respect to the fixed housing part 9. The planet carrier 2 is therefore radially positioned in the transmission housing 11 by a centering device 38 mounted on an inner diameter of the transmission housing 11. The tolerance between the centering device 38 and the planet carrier 2 is selected such that the centering device 38 also functions as a sealing seat, the planet carrier 2 being pressed into the transmission housing 11. Alternatively, it is conceivable to provide the centering device 38 of the planet carrier 2 on the outer circumference of the planet carrier 2. In some instances, a seal is provided at the inner circumferential surface 33 between the planet carrier 2 and the transmission housing 11.

At its outer diameter, the planet carrier 2 is secured via a driving tooth system 13 against rotation with respect to the fixed housing part 9 or the transmission housing 11. The driving tooth system 13 is arranged on a side piece 2a of the planet carrier 2 in the radially outer region of the side piece 2a and is provided for non-rotatably accommodating the planet carrier 2 on the fixed housing part 9. In addition, the driving tooth system 13 protrudes from an axial end face of the planet carrier 2. More particularly, the driving tooth system 13 is formed (in a manner not shown in greater detail) as external toothing on the planet carrier 2 and as internal toothing on the fixed housing part 9. In the present case, the driving tooth system 13 is arranged in the main housing, i.e., on the transmission housing 11 of the transmission 1, wherein the transmission housing 11 in turn is connected to a chassis (not shown here) of the motor vehicle. As a result, it is not necessary to guide the transmission support torque introduced at the driving tooth system 13 away via further housing interfaces, such as, for example, a cover element 34.

The housing interface between the transmission housing 11 and the cover element 34, in particular the provided fasteners, is therefore slimmer.

The driving tooth system 13 is arranged within the lubricant chamber 8. A sealing element 24, such as an O-ring, is arranged spatially between the planet carrier 2 and the fixed housing part 9 in the region of the driving tooth system 13 or next to the driving tooth system 13, such that the sealing element 24 seals the lubricant chamber 8. The sealing element 24 is positioned such that the driving tooth system 13 is located in the lubricant chamber 8. As a result, torsional vibrations from the first planetary gear set 6 and load reversal shocks between the planet carrier 2 and the transmission housing 11 are damped, because lubricant must first be displaced for each micromovement. Also, while not shown in detail, the teeth of the driving tooth system 13 have irregular toothing geometries to avoid an incorrect installation of the planet carrier 2 on the housing component 9 or on the transmission housing 11. In this way, the planet carrier 2 is always inserted in the same desired angular position. Therefore, the planet gears of the first planetary gear set 6 are also always in the same position. The goal is to always ensure optimal lubrication of all planet gears 3.

The fixed housing part 9, i.e., the transmission housing 11 in this case, conducts a coolant on an axial side facing away from the lubrication chamber 8. The coolant or "cooling medium" dissipates heat from the lubricant chamber 8, through which lubricant flows, and simultaneously cools the drive unit 15. The axial side of the transmission housing 11 that conducts the cooling medium includes a first surface structure 22, which enlarges or maximizes a surface which is in contact with a cooling medium, and induces eddies in the cooling medium, with the eddies improving a transfer of heat from the fixed housing part 9 to the cooling medium. The axial side of the transmission housing 11 that conducts the cooling medium also include ducts 37 which conduct cooling medium. The fixed housing part 9 also has a second surface structure 23 on an axial side facing the lubricant chamber 8, the second surface structure 23 enlarging or maximizing a surface which is in contact with the lubricant and inducing eddies in the lubricant, the eddies improving a transfer of heat from the lubricant to the fixed housing part 9. Therefore, a transfer of heat from the annular lubricant chamber 8 to the coolant-conveying cooling circuit is improved due to the surface structures 22, 23 on the fixed housing part 9. The surface structures 22, 23 are formed as a honeycomb structure, a rib structure and/or as a pin-fin structure. In FIG. 2, the surface structures 22, 23 are ribs.

Any overflowing lubricant not branched off to the planetary bearings 7 emerges from the lubricant chamber 8 via the lubricant duct 35. The lubricant duct 35 is provided for cooling and lubricating further components of the drive train 20, in particular further components of the transmission 1 and of the drive unit 15. The lubricant duct 35 is composed of multiple fluidically interconnected duct sections which are provided in the cover element 34 already during casting and mechanically introduced into or cast in the transmission housing 11.

The invention is not limited to the disclosed embodiments. Other embodiments or variations result for a person skilled in the art within the scope of the utilization of the present invention and within the scope of a precise analysis of the drawings, the description and the patent claims. In particular, a person skilled in the art recognizes that the drive train 20, depending on the available installation space, may alternatively have the cover element 34 of the transmission 1 or the stator carrier 18 of the drive unit 15 provided as a fixed housing part 9, in order to form the lubricant chamber 8 together with the planet carrier 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission
2 planet carrier of the first planetary gear set
2a side piece of the planet carrier
3 planet gear of the first planetary gear set
4 sun gear of the first planetary gear set
5 ring gear of the first planetary gear set
6 first planetary gear set
7 planetary bearing
8 lubricant chamber
9 fixed housing part
10 integral differential
11 transmission housing
12 planet shaft
13 driving tooth system
14 second planetary gear set
15 drive unit
16 first output shaft
17 second output shaft
18 stator carrier
19 Stator
20 drive train
21 Rotor
22 first surface structure
23 second surface structure
24 sealing element
25 axial duct
26 radial duct
27 planet carrier of the second planetary gear set
28 sun gear of the second planetary gear set
29 ring gear of the second planetary gear set
30 pin
31 recess in the fixed housing part
32 recess in the planet carrier
33 inner circumferential surface of the transmission housing
34 cover element
35 lubricant duct
36 rotor shaft
37 duct
38 centering device

The invention claimed is:

1. A transmission (1) for an integral differential (10), comprising:
   a fixed housing part (9);
   a first planetary gear set (6) defining an axis of rotation, the first planetary gear set (6) comprising:
      a planet carrier (2) fixed to the fixed housing part (9) to seal a lubricant chamber (8) spatially delimited by the planet carrier (2) and the fixed housing part (9), at least a portion of the lubricant chamber (8) extending around the axis of rotation;
      planetary bearings (7), the planetary bearings (7) being supplied with lubricant from the lubricant chamber (8);
      planet gears (3), each of the planet gears (3) being rotatably mounted on the planet carrier (2) via at least one respective bearing of the planetary bearings (7);
      a sun gear (4) meshing with the planet gears (3); and
      a ring gear (5) meshing with the planet gears (3); and
   a sealing element (24) between the planet carrier (2) and the fixed housing part (9), the sealing element (24) further sealing the lubricant chamber (8).

2. The transmission (1) of claim 1, wherein the fixed housing part (9) is a transmission housing (11) of the transmission (1).

3. The transmission (1) of claim 1, wherein the fixed housing part (9) is a cover element (34) of the transmission (1).

4. The transmission (1) of claim 1, wherein the first planetary gear set (6) further comprises planet shafts (12) on the planet carrier (2), each of the planetary bearings (7) being rotatably mounted on a respective one of the planet shafts (12), each of the planet shafts (12) being fixed relative to the planet carrier (2) from within the lubricant chamber (8).

5. The transmission (1) of claim 1, wherein the first planetary gear set (6) further comprises planet shafts (12) on the planet carrier (2), each of the planetary bearings (7) being rotatably mounted on a respective one of the planet shafts (12), each of the planet shafts (12) having at least one of an axially extending duct (25) or a radially extending duct (26) for at least indirectly fluidically connecting the lubricant chamber (8) to the respective planetary bearing (7).

6. The transmission (1) of claim 5, wherein each of the planet shafts (12) defines an orifice bore as part of one or more of the at least one of the axially extending duct (25) or the radially extending duct (26).

7. The transmission (1) of claim 1, wherein at least a portion of one or both of the planet carrier (2) and the fixed housing part (9) is produced via casting.

8. The transmission (1) of claim 1, wherein the planet carrier (2) is rotationally fixed with respect to the fixed housing part (9) via a tooth system (13).

9. The transmission (1) of claim 8, wherein the tooth system (13) is within the lubricant chamber (8).

10. The transmission (1) of claim 8, wherein the tooth system (13) is defined by a side piece (2a) of the planet carrier (2) at a radially outer area of the side piece (2a) or a radially inner area of the side piece (2a).

11. The transmission (1) of claim 8, wherein the tooth system (13) is defined on an axial end face of the planet carrier (2).

12. The transmission (1) of claim 8, wherein the tooth system (13) only allows the planet carrier (2) to be installed in one position.

13. The transmission (1) of claim 1, wherein the planet carrier (2) is at least one of axially secured or centered by the fixed housing part (9).

14. The transmission (1) of claim 1, wherein a side of the fixed housing part (9) facing away from the lubricant chamber (8) conducts cooling medium.

15. The transmission (1) of claim 14, wherein the side of the fixed housing part (9) facing away from the lubricant chamber (8) has a surface structure (22), the surface structure (22) enlarging contact between the fixed housing part (9) and cooling medium.

16. The transmission (1) of claim 15, wherein the surface structure (22) is at least one of a honeycomb structure, a rib structure, or a pin-fin structure.

17. The transmission (1) of claim 1, wherein a side of the fixed housing part (9) facing the lubricant chamber (8) has a surface structure (23), the surface structure (23) enlarging contact between the fixed housing part (9) and lubricant.

18. The transmission (1) of claim 17, wherein the surface structure (23) is at least one of a honeycomb structure, a rib structure, or a pin-fin structure.

19. An integral differential (10) for a drive train (20) of a motor vehicle, the integral differential (10) comprising:
the transmission (1) of claim 1, the transmission (1) further comprising a second planetary gear set (14) operatively connected to the first planetary gear set (6).

20. A drive train (20) for a motor vehicle, comprising:
the integral differential (10) of claim 19;
a first output shaft (16);
a second output shaft (17); and
a drive unit (15) which generates drive power distributed onto the first and second output shafts (16, 17) at least indirectly via the integral differential (10).

21. The drive train (20) of claim 20, wherein the drive unit (15) is an electric machine, the electric machine including a stator (19) fixed on a stator carrier (18), and a rotor (21) rotatable with respect to the stator (19), the stator carrier (18) being the fixed housing part (9) of the transmission (1).

* * * * *